United States Patent
Kwon et al.

(10) Patent No.: US 10,626,877 B2
(45) Date of Patent: Apr. 21, 2020

(54) METHOD AND SYSTEM FOR CONTROLLING COOLING FAN IN VEHICLE

(71) Applicant: Hyundai Motor Company, Seoul (KR)

(72) Inventors: Mun Soon Kwon, Gyeonggi-do (KR); Jung Tae Cho, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1088 days.

(21) Appl. No.: 14/887,633

(22) Filed: Oct. 20, 2015

(65) Prior Publication Data

US 2016/0131018 A1  May 12, 2016

(30) Foreign Application Priority Data

Nov. 6, 2014 (KR) .................. 10-2014-0153651

(51) Int. Cl.
| F04D 27/00 | (2006.01) |
| F04D 15/00 | (2006.01) |
| B60H 1/32  | (2006.01) |
| B60L 58/26 | (2019.01) |
| F04D 19/00 | (2006.01) |

(Continued)

(52) U.S. Cl.
CPC ......... F04D 27/001 (2013.01); B60H 1/3208 (2013.01); B60L 58/26 (2019.02); F04D 15/0066 (2013.01); F04D 15/0077 (2013.01); F04D 27/004 (2013.01); B60H 2001/3266 (2013.01); B60H 2001/3277 (2013.01); F04D 19/002 (2013.01); H01M 10/613 (2015.04);
(Continued)

(58) Field of Classification Search
CPC .... F04D 19/002; F04D 27/004; F04D 27/001; F04D 15/0066; F04D 15/0077; B60L 58/26; H01M 10/613; H01M 10/625; H01M 10/6563; B60H 2001/3277; B60H 2001/3266; B60H 1/3208
See application file for complete search history.

(56) References Cited

U.S. PATENT DOCUMENTS 5,027,611 A * 7/1991 Doi ...................... B60H 1/0075
  165/202
6,708,669 B2 * 3/2004 Kadoi .................. B60H 1/3205
  123/339.17
(Continued)

FOREIGN PATENT DOCUMENTS

| CN | 1540145 A  | 10/2004 |
| EP | 0156078 A1 | 10/1985 |

(Continued)

OTHER PUBLICATIONS

First Chinese Office Action for Chinese Patent Application No. 2015107427892, dated Dec. 24, 2018, 15 pages.

Primary Examiner — Peter J Bertheaud
(74) Attorney, Agent, or Firm — Mintz Levin Cohn Ferris Glovsky and Popeo, P.C.; Peter F. Corless

(57) ABSTRACT

A method of controlling a cooling fan in a cooling system in a vehicle includes detecting presence/absence of abnormality in a communication state, measuring an output voltage level of an air-conditioner pressure transducer (APT) sensor when the abnormality in the communication state is detected, determining a cooling fan control condition based on the measured output voltage level, and controlling a cooling fan motor according to the determined cooling fan control condition.

16 Claims, 8 Drawing Sheets

(51) Int. Cl.
H01M 10/625 (2014.01)
H01M 10/613 (2014.01)
H01M 10/6563 (2014.01)

(52) U.S. Cl.
CPC ...... H01M 10/625 (2015.04); H01M 10/6563 (2015.04)

(56) References Cited

U.S. PATENT DOCUMENTS

| | | | | |
|---|---|---|---|---|
| 8,084,156 | B2* | 12/2011 | Okuda | B60L 3/0046 |
| | | | | 429/120 |
| 8,248,015 | B2* | 8/2012 | Huang | G01K 13/00 |
| | | | | 318/369 |
| 10,046,620 | B2* | 8/2018 | Kwon | B60H 1/3208 |
| 10,141,618 | B2* | 11/2018 | Kwon | H01M 10/633 |
| 10,322,644 | B2* | 6/2019 | Kwon | H01M 10/613 |
| 2004/0206099 | A1 | 10/2004 | Kim | |
| 2005/0210897 | A1 | 9/2005 | Oomura et al. | |
| 2007/0125106 | A1* | 6/2007 | Ishikawa | B60H 1/3217 |
| | | | | 62/183 |
| 2014/0223943 | A1* | 8/2014 | Ichishi | B60H 1/3205 |
| | | | | 62/215 |
| 2014/0370333 | A1* | 12/2014 | Kwon | H01M 10/625 |
| | | | | 429/50 |

FOREIGN PATENT DOCUMENTS

| | | |
|---|---|---|
| JP | 2000-156903 A | 6/2000 |
| JP | 2001-349217 A | 12/2001 |
| JP | 2004-268778 A | 9/2004 |
| JP | 2004-323001 A | 11/2004 |
| JP | 2008-517195 A | 5/2008 |
| JP | 2010-146920 A | 7/2010 |
| JP | 2010-161904 A | 7/2010 |
| JP | 2011-031876 A | 2/2011 |
| JP | 2011-246083 A | 12/2011 |
| KR | 10-1996-007289 A | 3/1996 |
| KR | 1998-049677 A | 9/1998 |
| KR | 10-0306009 B1 | 9/2001 |
| KR | 10-2002-0093393 A | 12/2002 |
| KR | 10-2010-0081438 A | 7/2010 |
| KR | 10-1182950 B1 | 9/2012 |
| KR | 10-1284343 B1 | 7/2013 |

* cited by examiner

METHOD AND SYSTEM FOR CONTROLLING COOLING FAN IN VEHICLE

CROSS-REFERENCE TO RELATED APPLICATION

This application claims under 35 U.S.C. § 119(a) the benefit of Korean Patent Application No. 10-2014-0153651, filed on Nov. 6, 2014, the entire contents of which are incorporated by reference.

BACKGROUND

(a) Field of the Invention

The present invention relates to a cooling system in a vehicle, and more particularly, to a method and system for controlling a cooling fan capable of adaptively controlling a cooling fan motor based on a communication state of the vehicle, revolutions per minute (RPM) of the cooling fan motor, and the like.

(b) Description of the Related Art

An engine room cooling system in a vehicle is a basic and important system for safe driving.

A conventional cooling system in a vehicle controls a cooling fan in an engine management system electronic control unit (EMS ECU) by transmitting data generated based on signals received from an air conditioner pressure transducer (APT) and an automatic temperature controller (ATC) to a pulse width modulation (PWM) controller in one way. In other words, the conventional EMS ECU transmits data to a cooling fan controller in one way and thus may not receive motor state information for checking an actual state of a cooling fan motor from the cooling fan controller.

In addition, there is a disadvantage that it is difficult to monitor a state of the cooling fan motor since the cooling fan controller and the cooling fan motor are separated from each other.

Moreover, the conventional vehicle cooling system has a configuration in which the EMS ECU controls a power relay to supply power to the cooling fan motor so as to drive the cooling fan motor. Therefore, wiring is complex and thus it is likely to experience a voltage drop and disconnection.

FIG. 1 illustrates a configuration of a cooling system in a vehicle according to the related art.

Referring to FIG. 1, the cooling system in the vehicle according to the related art may include an engine management system electronic control unit (EMS ECU) 110, a power relay 120, an air-conditioner pressure transducer (APT) 130, a cooling fan controller 140, a cooling fan 150, a battery sensor (B/SNSR) 160, an automatic temperature controller (ATC) 170, a cluster 180, and the like.

The EMS ECU 110 may perform a control operation to supply or shut off power necessary to drive the cooling fan 150 by being linked to the power relay 120.

The EMS ECU 110 delivers a control signal processed based on various sensing signals received from the APT 130, the ATC 170, and the like to a pulse width modulation (PWM) control module 145 included in the cooling fan controller 140. The PWM control module 145 drives a direct current (DC) motor 155 of the cooling fan 150 by generating a PWM signal based on the received control signal.

The EMS ECU 110 may determine a duty cycle, and deliver the determined duty cycle information as a duty signal having a certain frequency to the PWM control module 145. The PWM control module 145 may convert the received duty signal into a PWM signal, and then a motor driving transistor (not illustrated) may integrate the converted PWM signal to control a voltage applied to the DC motor 155, thereby driving the cooling fan 150.

In the cooling system in the vehicle according to the related art, a cooling logic is present in the EMS ECU 110, and a duty cycle of operation of the cooling fan 150 may be determined based on the cooling logic. In particular, the EMS ECU 110 merely delivers the duty cycle determined based on the cooling logic to the PWM control module 145 in a unidirectional manner, and may not acquire state information of the DC motor 155. Hence, the EMS ECU 110 according to the related art may not provide a control scheme for compensating for engine revolutions per minute (RPM) based on the number of rotations of the DC motor 155 and an internal temperature of the cooling fan controller 140, for example, a temperature of a printed circuit board (PCB).

In addition, since the cooling fan controller 140 and the DC motor 155 are separated from each other, a state of the DC motor 155 may not be effectively monitored. Moreover, since two-way communication between the EMS ECU 110 and the cooling fan controller 140 is not provided, driving state information of the cooling fan 150 may not be checked from the EMS ECU 110.

Besides, since the cooling system in the vehicle according to the related art has a configuration in which power for driving the DC motor 155 is delivered to the cooling fan controller 140 through the power relay 120, the DC motor 155 may be controlled only when power supply is available. Moreover, the cooling system has a complex internal wiring configuration and thus is likely to experience a voltage drop and disconnection due to wires.

SUMMARY

Accordingly, the present invention is directed to a method and system for controlling a cooling fan in a vehicle.

An object of the present invention is to provide a method of adaptively controlling a cooling fan during abnormal communication in a vehicle, and an apparatus and system for the same.

Another object of the present invention is to provide a method of controlling a cooling fan with a low internal wiring complexity and a high stability, and an apparatus and system for the same by configuring a cooling system through communication in a vehicle.

A further object of the present invention is to provide a method of controlling a cooling fan capable of performing engine compensation control, and an apparatus and system for the same by additionally providing an RPM monitoring function of a cooling fan motor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a cooling fan in a cooling fan controller includes detecting presence/absence of abnormality in a communication state, measuring an output voltage level of an air-conditioner pressure transducer (APT) sensor when the abnormality in the communication state is detected, determining a cooling fan control condition based on the measured output voltage level, and controlling a cooling fan motor according to the determined cooling fan control condition.

In this instance, at least one of a wiring state, an air conditioner operation state, and a vehicle starting state may be identified based on the measured output voltage level.

The vehicle starting state may be determined to be an IG1 OFF state when the measured output voltage level is 0V.

The wiring state may be determined to be an open state when the measured output voltage level is 0V.

A predetermined control signal may be transmitted so that a predetermined warning alarm indicating an open state or a disconnected state of wiring may be displayed on a vehicle instrument panel when the measured output voltage level is 0V.

The control signal may be directly transmitted to a cluster through either controller area network (CAN) communication or local interconnect network (LIN) communication.

The control signal may be transmitted to an engine management system electronic control unit (EMS ECU) through either CAN communication or LIN communication.

The vehicle starting state may be determined to be an IG1 ON state and the air conditioner operation state may be determined to be an OFF state when the measured output voltage level is a first reference value.

The vehicle starting state may be determined to be the IG1 ON state and the air conditioner operation state may be determined to be an ON state when the measured output voltage level is greater than the first reference value and less than a second reference value.

The first reference value and the second reference value may be set to 1V and 5V, respectively.

In another aspect of the present invention, a method of controlling a cooling fan in an EMS ECU linked to a cooling fan controller includes receiving information about motor revolutions per minute (RPM) from the cooling fan controller, determining whether a change rate of the received motor RPM is greater than a first reference value, calculating a ratio of a difference between motor RPM in a normal state and the received motor RPM when the change rate is greater than the first reference value, and performing correction control such that the motor RPM is in the normal state based on the calculated ratio.

Here, the correction control may be performed when the calculated ratio is greater than a second reference value and less than or equal to a third reference value.

A control operation may be performed such that a predetermined warning alarm indicating engine abnormality is displayed on a vehicle instrument panel when the calculated ratio is greater than the third reference value.

The first to third reference values may be set to 3%, 5% and 10%, respectively.

The motor RPM information may be received from the cooling fan controller using communication means corresponding to either CAN communication or LIN communication.

In another aspect of the present invention, there is provided a computer-readable recording medium that records a program for execution of one of the cooling fan control methods.

In another aspect of the present invention, a cooling fan controller includes a communication module for detecting presence/absence of abnormality in a communication state, a sensor calculation module for measuring an output voltage level of an APT sensor when the abnormality in the communication state is detected, and a main controller for determining a cooling fan control condition based on the measured output voltage level, and controlling a cooling fan motor according to the determined cooling fan control condition.

In another aspect of the present invention, an EMS ECU linked to a cooling fan controller includes means for receiving information about motor RPM from the cooling fan controller, means for determining whether a change rate of the received motor RPM is greater than a first reference value, means for calculating a ratio of a difference between motor RPM in a normal state and the received motor RPM when the change rate is greater than the first reference value, and means for performing correction control such that the motor RPM is in the normal state based on the calculated ratio.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
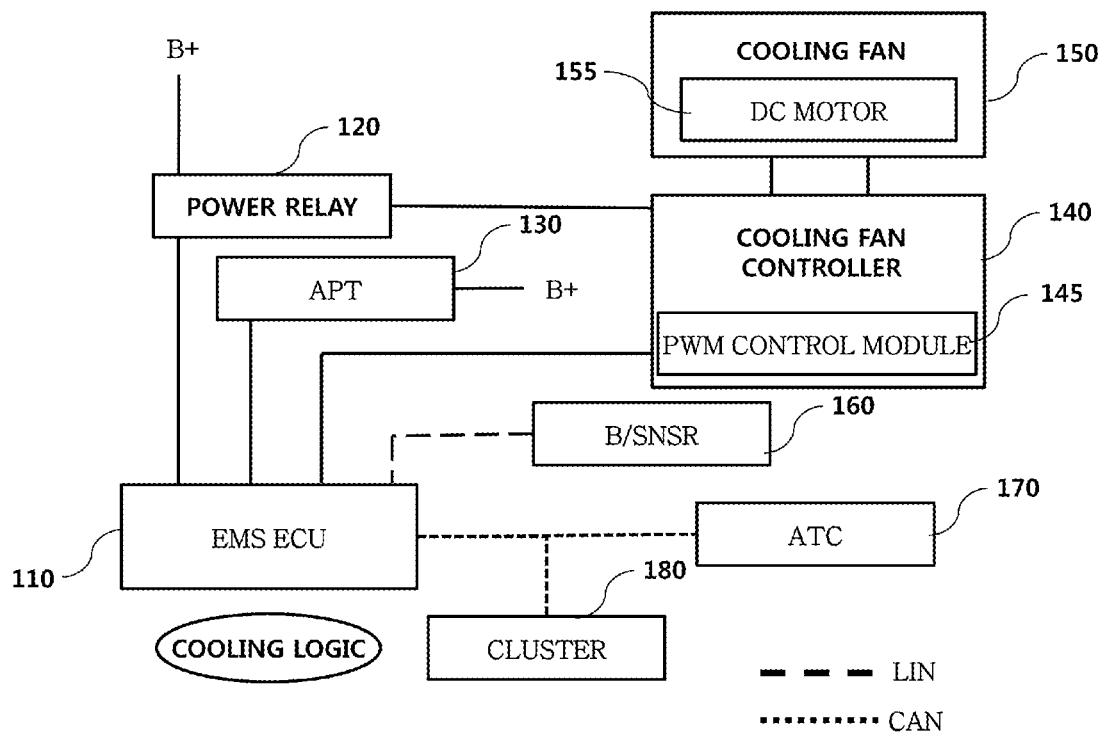
FIG. 1 (RELATED ART) is a block diagram illustrating a configuration of a cooling system in a vehicle according to the related art.

Reference will now be made in detail to the preferred embodiments of the present invention, examples of which are illustrated in the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

The suffixes "module" and "unit" of elements herein are used for convenience of description and thus can be used interchangeably and do not have any distinguishable meanings or functions.

Although all elements constituting the embodiments of the present invention are described as being integrated into a single one or operated as a single one, the present invention is not necessarily limited to such embodiments. According to embodiments, all of the elements may be selectively integrated into one or more and be operated as one or more within the object and the scope of the present invention.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as "being connected to", "being coupled to", or "accesses" another element, one element may "be connected to", "be coupled to", or "accessing" another element via a further element although one element may be directly connected to or directly access another element.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 2:
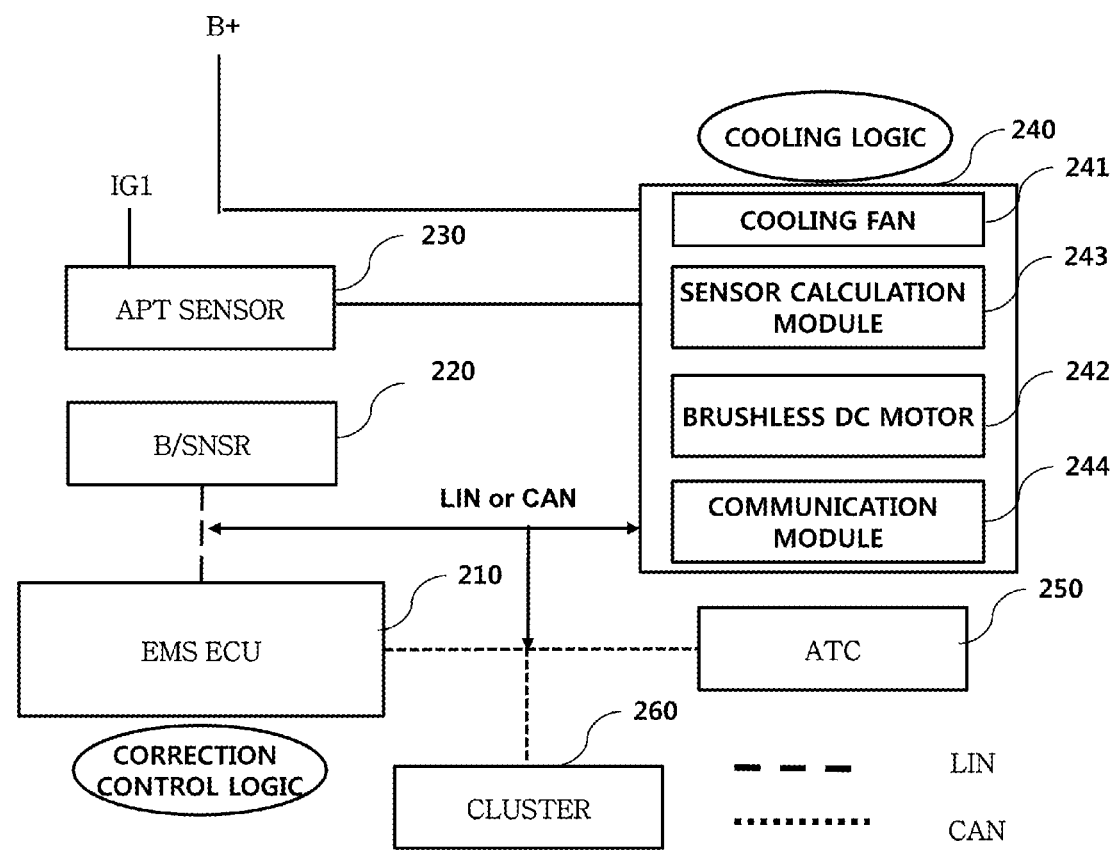
FIG. 2 is a block diagram illustrating a configuration of a cooling system in a vehicle according to an embodiment of the present invention.

FIG. 2 illustrates a configuration of a cooling system in a vehicle according to an embodiment of the present invention.

Hereinafter, local interconnect network (LIN) communication and controller area network (CAN) communication, each of which corresponds to a communication network in the vehicle applied to the present invention, are briefly described.

LIN communication corresponds to a communication scheme mainly used for data transmission among an ECU, an active sensor, and an active actuator. LIN communication has a simple protocol structure, is configured as a 12V single wire bus, and operates based on a master-slave principle.

CAN communication is mainly used for data transmission between ECUs of a vehicle safety system and a convenience specification system, control of an information/communication system and an entertainment system, and the like. In CAN communication, data is transmitted through a CAN_H line and a CAN_L line coated to be shielded, and mutually twisted. CAN communication may operate based on a multi-master principle in which a plurality of ECUs perform master functions in a master/slave system.

Referring to FIG. 2, the cooling system in the vehicle according to the present invention may include an EMS ECU 210, a B/SNSR 220, an APT sensor 230, a cooling fan controller 240, an ATC 250, and a cluster 260.

The cooling fan controller 240 may include a cooling fan 241, a brushless DC motor 242 for driving the cooling fan 241, a sensor calculation module 243, and a communication module 244.

The brushless DC motor 242 is characterized by transforming a coil included in a motor into a transistor rather than a mechanical brush. The brushless DC motor 242 does not generate a spark due to the absence of a brush and thus may reduce a risk of a gas explosion. In addition, when compared with a general DC motor that uses a mechanical rectification apparatus, the brushless DC motor 242 has a simple structure, is light in weight, may be rotated at a high speed, generates low noise, and is excellent in electromagnetic compatibility.

The communication module 244 provides functions of LIN communication and CAN communication. The communication module 244 may monitor connection states of LIN communication and CAN communication. When an abnormality in connection to LIN communication and/or CAN communication is identified, a certain control signal indicating that a communication state is abnormal may be transmitted to the sensor calculation module 243.

As an example, the cooling fan controller 240 may be connected to the B/SNSR 220 through LIN communication. In addition, the cooling fan controller 240 may be connected to the EMS ECU 210, the ATC 250, the cluster 260, and the like through CAN communication. Here, the cluster 260 is a controller that controls a vehicle instrument panel. The cluster 260 displays various types of information, for example, a speed, a traveled distance, an indoor temperature, a warning alarm, and the like on the vehicle instrument panel.

As another example, the cooling fan controller 240 may be connected to the EMS ECU 210 through LIN communication.

The cooling fan controller 240 may receive control information from the EMS ECU 210 through LIN communication or CAN communication, and measure information about the number of rotations of the brushless DC motor 242, that is, motor RPM information, and then transmit the measured motor RPM information to the EMS ECU 210.

In this instance, the EMS ECU 210 may perform engine correction control according to a predefined correction control logic using the received motor RPM information. Here, the engine correction control may be performed according to the correction control logic further using, in addition to the received motor RPM information, at least one of coolant temperature information, vehicle speed information, air conditioner pressure information, air conditioner switch state information, throttle position information corresponding to an opening angle of an air intake switch of a throttle body and ambient temperature information collected from various sensors.

The APT sensor 230 is a controller that changes a pressure of an air conditioner. The APT sensor 230 may include an output voltage (Vout) terminal connected to the sensor calculation module 243 of the cooling fan controller 240.

When abnormal communication is detected by the communication module 244, the sensor calculation module 243 may measure an output voltage level of the APT sensor 230, and identify a vehicle state by comparing the measured output voltage level with predetermined reference value(s). Here, the vehicle state may include a wiring state, an air conditioner operation state, a vehicle starting state, and the like. In addition, the sensor calculation module 243 may determine a cooling fan control condition corresponding to the identified vehicle state. Here, the cooling fan control condition may be divided into condition A, condition B, condition C, and the like. The cooling fan controller 240 may control a cooling fan motor by entering a fail-safe mode corresponding to the determined cooling fan control condition.

The cooling fan controller 240 may enter the fail-safe mode corresponding to the determined cooling fan control condition to perform a control operation. For example, the cooling fan controller 240 may perform criterion control corresponding to an ON state of an air conditioner operation, perform criterion control corresponding to an OFF state of the air conditioner operation, or perform warning display control on the vehicle instrument panel. Here, criterion control may refer to control of a driving duty cycle of the cooling fan motor.

As an example, when the measured output voltage level is 0V, the cooling fan controller 240 may generate a predetermined warning alarm signal that indicates an open state or a disconnected state of wiring, and transmit the generated signal to the EMS ECU 210. Subsequently, the EMS ECU 210 may control the cluster 260 to display a warning alarm according to the received warning alarm signal.

As another example, when the measured output voltage level is 0V, the cooling fan controller 240 may directly transmit a predetermined control signal to the cluster 260 through LIN communication or CAN communication so that a predetermined warning alarm that indicates an open state or a disconnected state of wiring is displayed on the vehicle instrument panel.

Accordingly, the cooling system in the vehicle according to the present invention is characterized in that a cooling logic is included in the cooling fan controller 240 rather than the EMS ECU 210.

Figure 3:
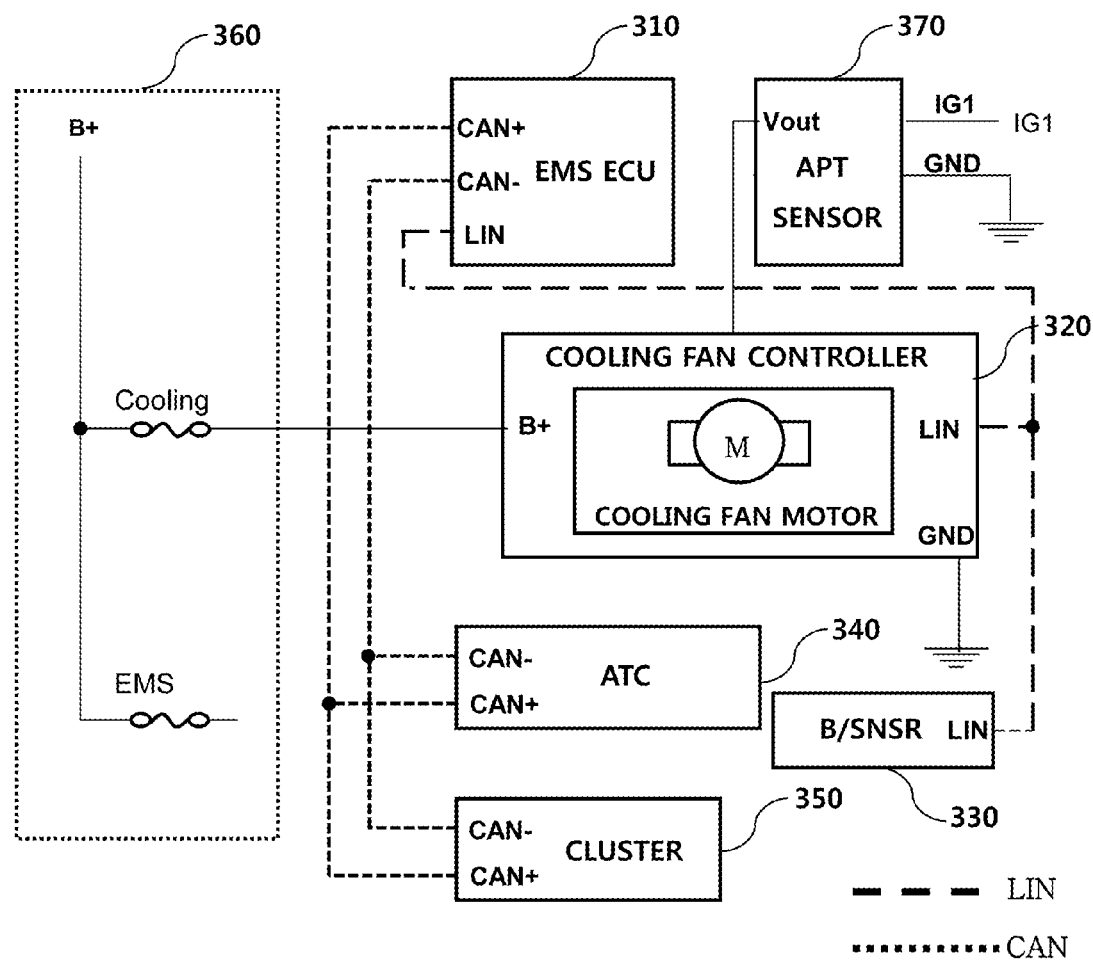
FIG. 3 is a block diagram illustrating a configuration of a cooling system in a vehicle using controller area network (CAN) communication according to an embodiment of the present invention.

FIG. 3 illustrates a configuration of a cooling system in a vehicle using CAN communication according to an embodiment of the present invention.

Referring to FIG. 3, an EMS ECU 310 may be connected to a cooling fan controller 320 and a B/SNSR 330 through LIN communication. In addition, the EMS ECU 310 may be connected to an ATC 340 and a cluster 350 through CAN communication.

Power for operating the cooling fan controller 320 may be directly supplied to the cooling fan controller 320 through a cooling terminal of a battery 360.

An output voltage (Vout) terminal of an APT sensor 370 may be directly connected to a certain terminal of the cooling fan controller 320.

Figure 4:
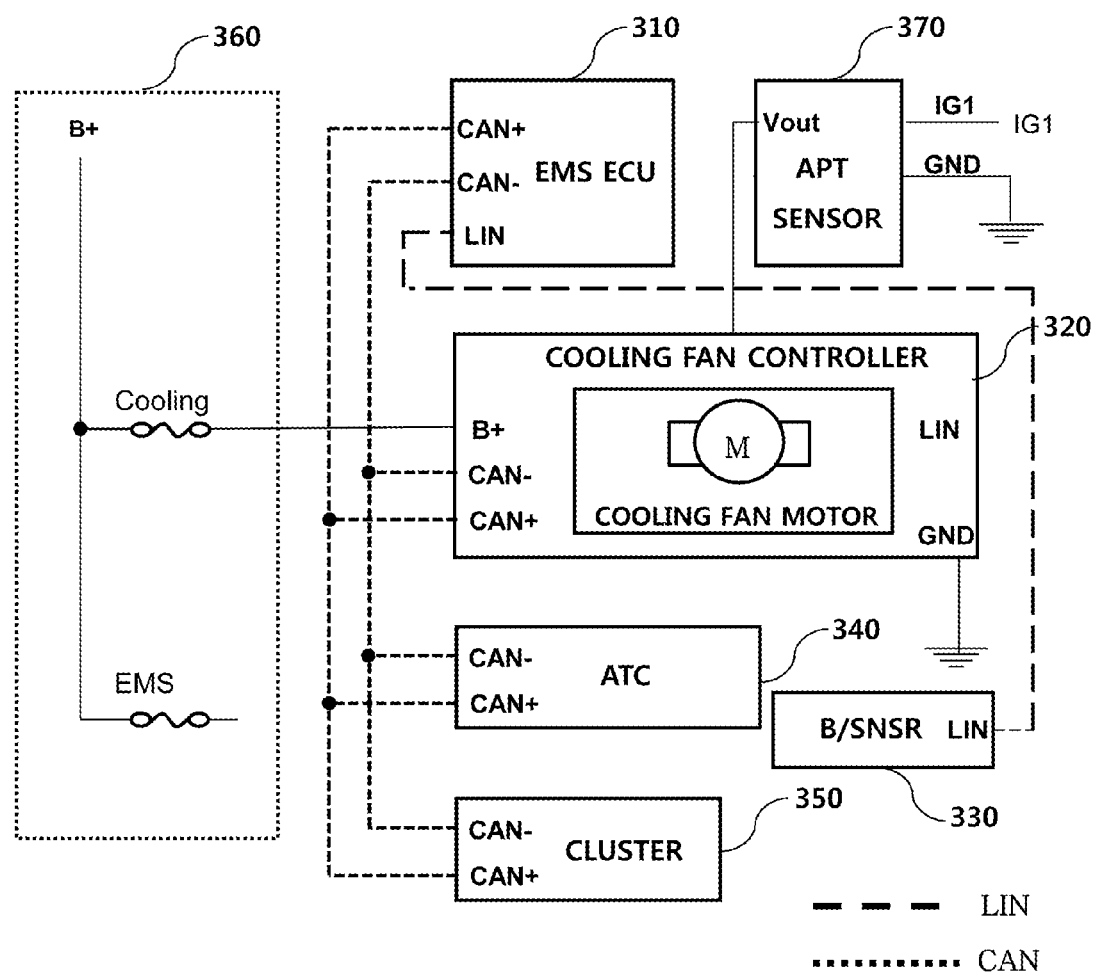
FIG. 4 is a block diagram illustrating a configuration of a cooling system in a vehicle using local interconnect network (LIN) communication according to an embodiment of the present invention.

FIG. 4 illustrates a configuration of a cooling system in a vehicle using LIN communication according to an embodiment of the present invention.

Referring to FIG. 4, the EMS ECU 310 may be connected to the cooling fan controller 320, the ATC 340 and the cluster 350 through CAN communication. In addition, the EMS ECU 310 may be connected to the B/SNSR 330 through LIN communication.

Power for operating the cooling fan controller 320 may be directly supplied to the cooling fan controller 320 through the cooling terminal of the battery 360.

The output voltage (Vout) terminal of the APT sensor 370 may be directly connected to the certain terminal of the cooling fan controller 320.

As illustrated in FIGS. 3 and 4, the EMS ECU 310 may be connected to the cooling fan controller 320 through LIN communication or CAN communication. Moreover, the EMS ECU 310 and the cooling fan controller 320 may perform two-way communication through LIN communication or CAN communication.

In addition, power for driving the cooling fan motor may be supplied to the cooling fan controller 320 through direct connection to the cooling terminal of the battery 360 without using a separate power relay.

Moreover, the cooling fan controller 320 may perform procedures of measuring an output voltage signal strength of the APT sensor 370 upon detecting abnormal communication, determining a cooling fan duty cycle control condition based on the measured output voltage signal strength, and controlling a cooling fan duty cycle with reference to a predetermined cooling fan duty cycle control table based on a result of the determination.

The EMS ECU 310 may receive information about the number of rotations of the motor, for example, motor RPM, from the cooling fan controller 320 through LIN communication or CAN communication, and perform an engine correction control procedure by comparing the received number of rotations of the motor with the number of rotations of the motor in a normal state.

Figure 5:
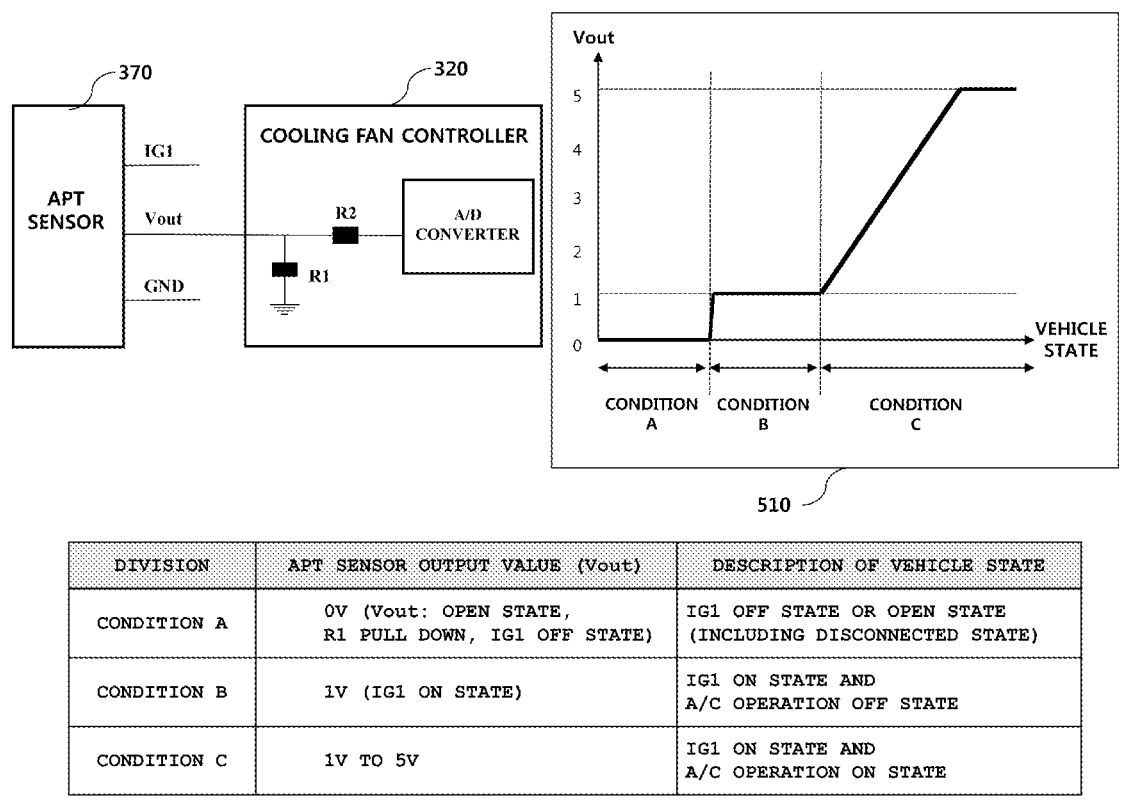
FIG. 5 is a diagram illustrating a method of controlling a cooling fan motor based on an air-conditioner pressure transducer (APT) signal according to an embodiment of the present invention.

FIG. 5 illustrates a method of controlling the cooling fan motor based on an APT signal according to an embodiment of the present invention.

Referring to FIG. 5, the cooling fan controller 320 may perform alternating current (AC)-DC conversion of an output voltage (Vout) signal of the APT sensor 370, and then measure a level of an output voltage.

The cooling fan controller 320 may determine that a vehicle state corresponds to condition A when the measured output voltage level is 0V, condition B when the measured output voltage level is 1V, and condition C when the measured output voltage level is greater than 1V and less than 5V with reference to a cooling fan control condition determination graph, denoted by reference numeral 510.

In general, a vehicle starting state may be divided into an OFF state, an ACC ON state, an ignition 1 (IG1) state, an IG2 state, a start state, that is, an ST stat, and the like. Here, the ACC ON state refers to a state in which electronic units for vehicle accessories such as a stereo, a clock, a cigarette lighter, and the like are operated. The IG1 state refers to a state in which electronic units for operations of an engine and a transmission are operated. The IG2 state refers to a state in which electronic units, which are not used for starting a vehicle, consuming a large amount of current such as lights, heat rays, power windows, wipers, and the like are operated. The start state refers to a state in which a starter motor is operated.

Condition A mentioned above may refer to a state in which a vehicle is in an IG1 OFF state or is in an open state, including a disconnected state, condition B may refer to a state in which the vehicle is in an IG1 ON state and the air conditioner operation is in an OFF state, and condition C may refer to a state in which the vehicle is in the IG1 ON state and the air conditioner operation is in an ON state.

Figure 6:
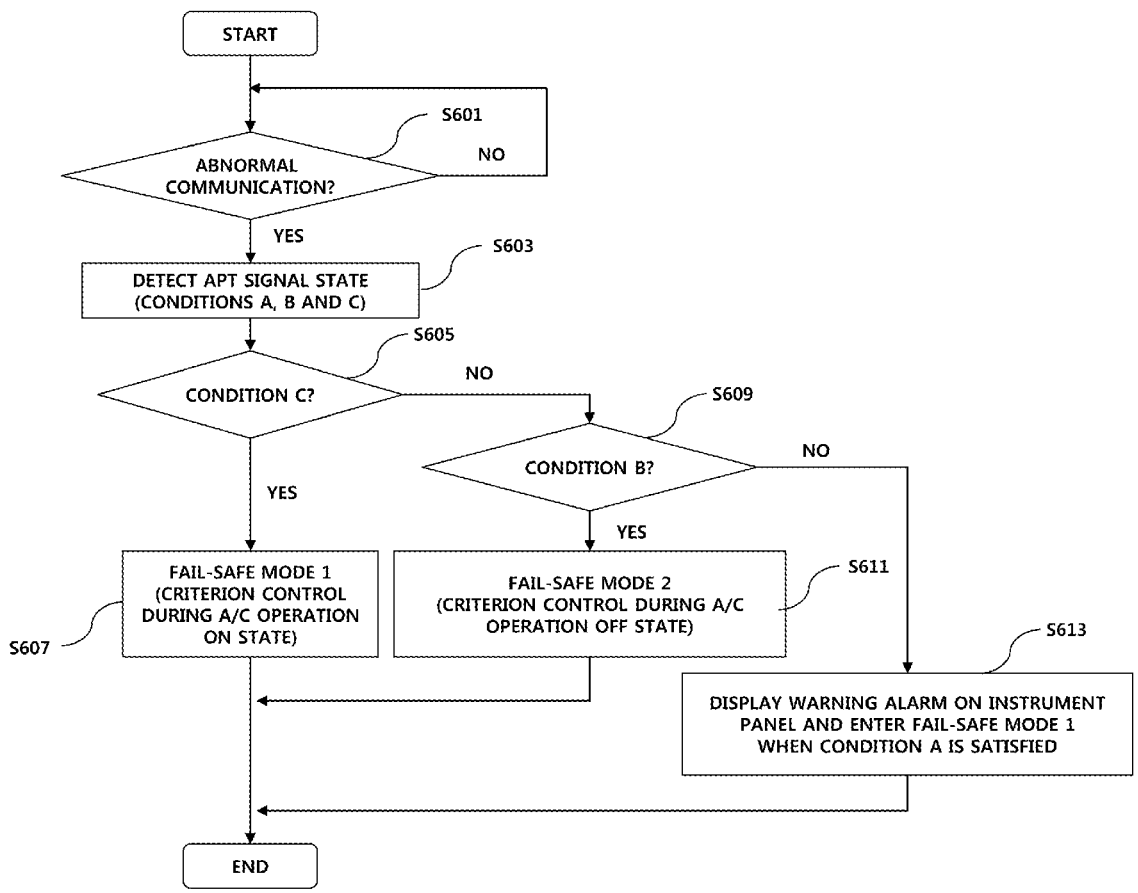
FIG. 6 is a flowchart illustrating a method of controlling a cooling system during abnormal communication according to an embodiment of the present invention.

FIG. 6 illustrates a method of controlling a cooling system during abnormal communication according to an embodiment of the present invention.

Referring to FIG. 6, upon detecting abnormal communication through the communication module 244, the cooling fan controller 320 measures an output voltage (Vout) level of the APT sensor 370, and determines a cooling fan duty cycle control condition corresponding to the measured output voltage level in S601 to S603.

When the determined cooling fan duty cycle control condition corresponds to condition C, that is, the vehicle is in the IG1 state and the air conditioner is in the ON state, the cooling fan controller 320 enters fail-safe mode 1 to control a cooling fan duty cycle in S605 to S607.

When the determined cooling fan duty cycle control condition corresponds to condition B, that is, the vehicle is in the IG1 ON state and the air conditioner operation is in the OFF state, the cooling fan controller 320 enters fail-safe mode 2 to control the cooling fan duty cycle in S609 to S611.

When the determined cooling fan duty cycle control condition corresponds to neither condition C nor condition B, that is, corresponds to condition A (in the IG1 OFF state or the open state), the cooling fan controller 320 delivers a warning signal to the cluster 350, and enters fail-safe mode 1 to control the cooling fan duty cycle in S613.

Figure 7:
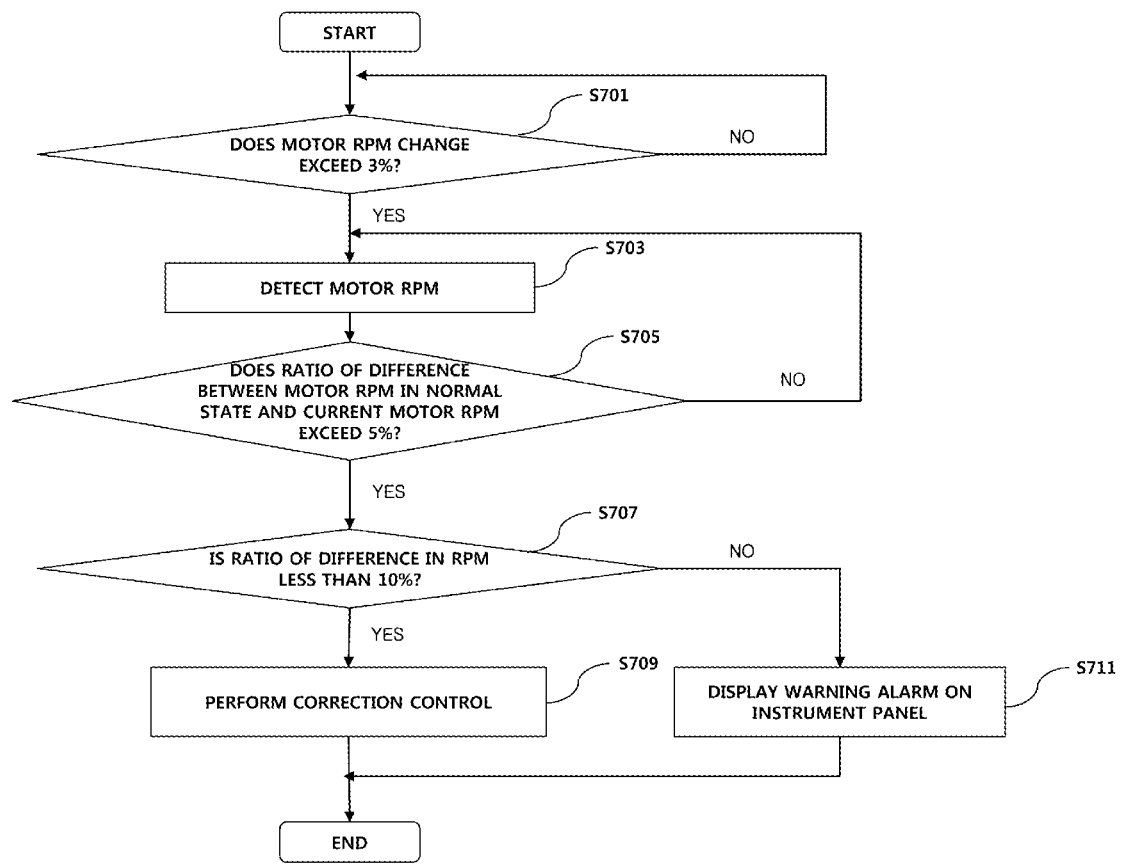
FIG. 7 is a flowchart illustrating a correction method in an engine management system electronic control unit (EMS ECU) based on RPM of the cooling fan motor according to an embodiment of the present invention.

FIG. 7 illustrates a correction method in the EMS ECU 310 based on RPM change of the cooling fan motor according to an embodiment of the present invention.

The EMS ECU 310 according to the present invention may perform two-way communication with the cooling fan controller 320 through CAN communication or LIN communication. The cooling fan controller 320 may measure the number of rotations of the cooling fan motor in real time, and deliver a result of the measurement to the EMS ECU 310 in real time through a two-way communication channel. To this end, the cooling fan controller 320 may be equipped with a motor RPM calculation module for calculating the number of rotations of the cooling fan motor in real time.

Referring to FIG. 7, the EMS ECU 310 according to the present invention verifies whether a rate of RPM change of the cooling fan motor during a predetermined period of time exceeds a first reference value, for example, 3% in S701.

When the rate of RPM change of the cooling fan motor exceeds 3% as a result of the verification, the EMS ECU 310 calculates a ratio of a difference between the current number of rotations of the motor, that is, the current motor RPM and the number of rotations of the motor in the normal state, that is, motor RPM in the normal state, and verifies whether the calculated ratio exceeds a second reference value, for example, 5% in S703 to S705.

Here, the ratio c of the difference between the current motor RPM c and the motor RPM in the normal state b may be calculated according to the following equation:

$$c=(|b-a|/a)*100(\%).$$

When the calculated ratio exceeds the second reference value as a result of the verification, and the calculated ratio is a value between the second reference value and a third reference value, for example, 10%, the EMS ECU 310 performs correction control according to a predefined engine correction algorithm so that RPM of the cooling fan motor is in the normal state in S707 to S709.

When the calculated ratio exceeds the third reference value as a result of the verification, the EMS ECU 310 may perform a control operation to deliver a predetermined warning alarm signal that indicates abnormal RPM of the cooling fan motor or engine abnormality to the cluster 350 to display a warning alarm on the instrument panel. A driver may visit a service center in response to the displayed warning alarm to check the vehicle.

When the calculated ratio does not exceed the second reference value in S707, the EMS ECU 310 may verify whether the calculated ratio exceeds the second reference value by continuously monitoring motor RPM to calculate the ratio.

Figure 8:
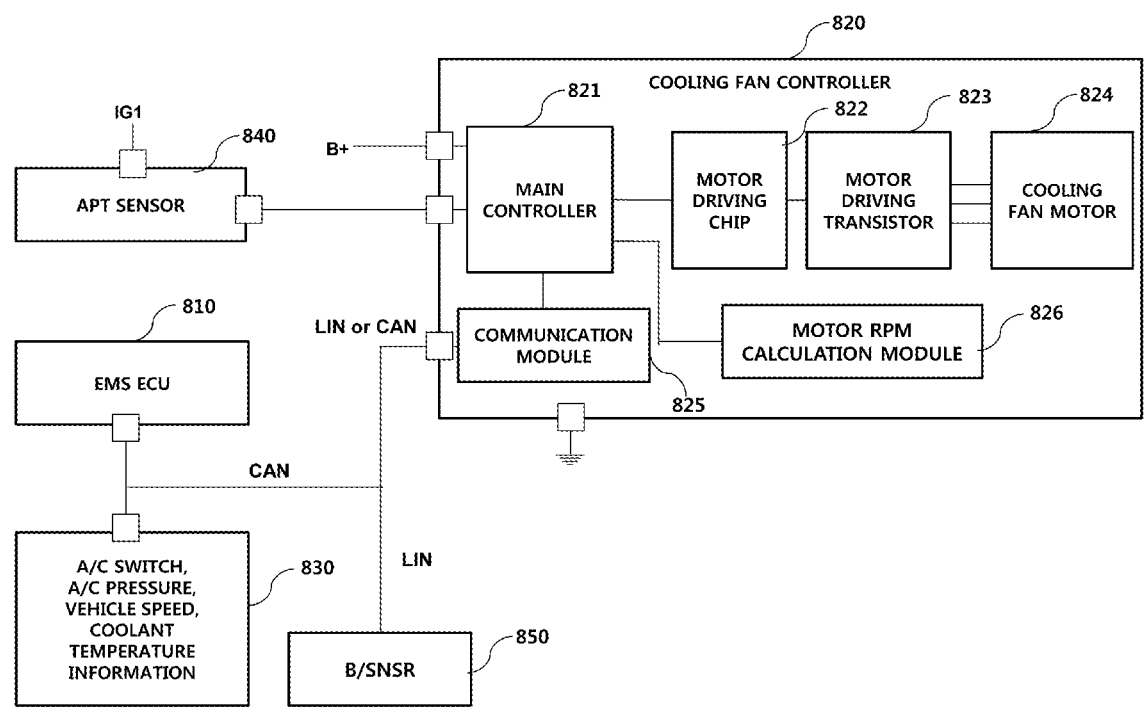
FIG. 8 is a block diagram illustrating a configuration of a cooling system in a vehicle according to another embodiment of the present invention.

FIG. 8 illustrates a configuration of a cooling system in a vehicle according to another embodiment of the present invention.

Referring to FIG. 8, an EMS ECU 810 may receive air conditioner switch input state information, air conditioner pressure state information, vehicle speed information, coolant temperature information, and the like in real time from controllers 830 that include various sensors.

In addition, the EMS ECU 810 may transmit a predetermined motor control signal for RPM control of a cooling fan motor to a cooling fan controller 820 through LIN communication or CAN communication.

Upon receiving the motor control signal through a communication module 825, the cooling fan controller 820 delivers the motor control signal to a main controller 821, and the main controller 821 delivers, to a motor driving chip 822, the motor control signal converted according to a cooling fan control condition determined based on an output signal Vout of an APT sensor 840.

The motor driving chip 822 delivers a PWM signal based on the received motor control signal to a motor driving transistor 823. The motor driving transistor 823 may integrate the PWM signal to apply a DC voltage necessary to drive a cooling fan motor 824.

A motor RPM calculation module 826 may receive the converted motor control signal from the main controller 821 to calculate RPM of the cooling fan motor 824 in real time. In this instance, information about the calculated RPM may be transmitted to the EMS ECU 810 through the main controller 821 and the communication module 825.

The EMS ECU 810 may perform engine compensation control by generating the motor control signal using various types of vehicle state information received from the sensors and cooling fan motor RPM information received from the cooling fan controller 820.

FIG. 8 illustrates that the cooling fan motor 824 is included in the cooling fan controller 820, which is merely an example. It should be noted that the cooling fan controller 820 and the cooling fan motor 824 may be separated from each other in another embodiment of the present invention.

Although not illustrated FIG. 8, the cooling fan controller 820 may additionally include a sensor calculation module 243 for calculating an output voltage Vout level of the APT sensor 840 during abnormal communication. The output voltage level measured by the sensor calculation module 243 may be delivered to the main controller 821, and the main controller 821 may determine a cooling fan control condition based on the delivered output voltage level.

Effects of a method and an apparatus according to the present invention are described below.

First, the present invention has an advantage of providing a method of controlling a cooling fan in a cooling system in a vehicle, and a system for the same.

Second, the present invention has an advantage of providing a method of adaptively controlling a cooling fan during abnormal communication in a vehicle, and an apparatus and system for the same.

Third, the present invention has an advantage of providing a method of controlling a cooling fan with a low internal wiring complexity and a high stability, and an apparatus and system for the same by configuration a cooling system through communication in a vehicle.

Fourth, decrease in weight of the entire system and reduction in time and cost for repair may be expected from the present invention by configuring a cooling system in a vehicle through CAN communication or LIN communication.

Fifth, the present invention has an advantage of providing a method of controlling a cooling fan capable of performing engine compensation control, and an apparatus and system for the same by additionally providing an RPM monitoring function of a cooling fan motor.

Effects that may be obtained from the present invention are not limited to the above-mentioned effects, and other effects not mentioned may be clearly understood by those skilled in the art from the above description.

Those skilled in the art will appreciate that the present invention may be carried out in other specific ways than those set forth herein without departing from the spirit and essential characteristics of the present invention.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of controlling a cooling fan in a cooling fan controller of a vehicle, the method comprising:
    detecting whether or not a communication state of a local interconnect network (LIN) or a controller area network (CAN) corresponding to a communication network in the vehicle is abnormal;
    measuring a voltage level of a signal output from an air-conditioner pressure transducer when the communication state is detected as abnormal;
    determining a cooling fan control condition based on the measured voltage level; and
    controlling a cooling fan motor according to the determined cooling fan control condition,
    wherein at least one of a wiring state, an air conditioner operation state, and a vehicle starting state is identified based on the measured voltage level.

2. The method according to claim 1, wherein the vehicle starting state includes an off state, an accessory on state, an ignition 1 state, and an ignition 2 state.

3. The method according to claim 2, wherein the ignition 1 state is determined to be an ignition 1 off state when the measured output voltage level is 0V.

4. The method according to claim 1, wherein the wiring state is determined to be an open state when the measured voltage level is 0V.

5. The method according to claim 1, wherein a predetermined control signal is transmitted so that a predetermined warning alarm indicating an open state or a disconnected state of wiring is displayed on a vehicle instrument panel when the measured voltage level is 0V.

6. The method according to claim 2, wherein the ignition 1 state is determined to be an ignition 1 on state and the air conditioner operation state is determined to be an air conditioner off state when the measured voltage level is a first reference value.

7. The method according to claim 6, wherein the vehicle starting state is determined to be the ignition 1 on state and the air conditioner operation state is determined to be an air conditioner on state when the measured output voltage is greater than the first reference value and less than a second reference value.

8. A cooling fan controller mounted on a vehicle, comprising:
    a communication module for detecting whether or not a communication state of a local interconnect network (LIN) or a controller area network (CAN) corresponding to a communication network in the vehicle is abnormal;
    a sensor calculation module for measuring a voltage level of a signal output from an air-conditioner pressure transducer when the communication state is detected as abnormal; and
    a main controller for determining a cooling fan control condition based on the measured voltage level, and controlling a cooling fan motor according to the determined cooling fan control condition,
    wherein the main controller identifies at least one of a wiring state, an air conditioner operation state, and a vehicle starting state based on the measured voltage level.

9. The cooling fan controller according to claim 8, wherein vehicle starting state includes an off state, an accessory on state, an ignition 1 state, and an ignition 2 state.

10. The cooling fan controller according to claim 9, wherein the ignition 1 state is determined to be an ignition 1 off state when the measured voltage level is 0V.

11. The cooling fan controller according to claim 8, wherein the wiring state is determined to be an open state when the measured voltage level is 0V.

12. The cooling fan controller according to claim 8, wherein a predetermined control signal is transmitted so that a predetermined warning alarm indicating an open state or a disconnected state of wiring is displayed on a vehicle instrument panel when the measured voltage level is 0V.

13. The cooling fan controller according to claim 12, wherein the control signal is directly transmitted to a cluster through either controller area network communication or local interconnect network communication.

14. The cooling fan controller according to claim 12, wherein the control signal is transmitted to an engine management system electric control unit through either controller area network communication or local interconnect network communication.

15. The cooling fan controller according to claim 9, wherein the ignition 1 state is determined to be an ignition 1 on state and the air conditioner operation state is determined to be an air conditioner off state when the measured voltage level is a first reference value.

16. The cooling fan controller according to claim 15, wherein the ignition 1 state is determined to be the ignition 1 on state and the air conditioner operation state is determined to be an air conditioner on state when the measured output voltage level is greater than the first reference value and less than a second reference value.

* * * * *